United States Patent Office 2,970,923
Patented Feb. 7, 1961

2,970,923
METHOD OF PREVENTING MARINE GROWTH, AND ANTIFOULING COMPOSITIONS USEFUL FOR SAID METHOD

Heinz Werner Sparmann, Berlin-Hermsdorf, Germany, assignor to Schering A.G., Berlin, Germany, a corporation of Germany No Drawing. Filed July 24, 1958, Ser. No. 750,839

Claims priority, application Germany July 31, 1957

4 Claims. (Cl. 106—15)

The present invention relates to a method of preventing marine growth, for instance, on ship bottoms, and to antifouling compositions.

The problem of protecting ship bottoms and other surfaces which are constantly exposed to the action of marine fouling organisms against their growth and accumulation is a very serious and long existing one. Such marine growth involves both plants and animals, such as acorn-shells (Balanidae), goose mussels (Lepadoids), barnacles (Conchodermae), tube-worms (Serpulidae), sea moss (Hydroidae), and algae. Heretofore, it was not possible to prevent marine growth on ship bottoms and hulls over a prolonged period of time, for instance, by applying thereto marine paints, although a large number of compositions have been proposed and tested for this purpose.

Therefore, it is one object of the present invention to provide a new and highly effective method of preventing marine growth on surfaces under water for a prolonged period of time.

Another object of the present invention is to provide antifouling compositions which exert their antifouling properties for a prolonged period of time.

Other objects of the present invention and advantageous features thereof will become apparent as the description proceeds.

In principle, the method of preventing marine growth on ship bottoms and similar underwater surfaces according to the present invention consists in using marine paints which contain, as highly effective antifouling agent, triphenyl tin chloride of the formula $(C_6H_5)_3SnCl$. Said antifouling agent may also be embodied in construction materials, for instance, in plastic materials which are used in the construction of watercraft, or in concrete used for underwater constructions. The antifouling agent according to the present invention may also be added to compositions which are used for impregnating wooden structures for underwater constructions.

By using triphenyl tin chloride as antifouling agent in compositions according to the present invention, it is now possible to practically prevent marine growth on underwater surfaces for a prolonged period of time. Triphenyl tin chloride is far superior as antifouling agent to other tin compounds as well as to other compounds proposed for this purpose.

The following tables serve to illustrate the unexpected advantageous effects of triphenyl tin chloride compared with those of similar compounds and known antifouling agents.

TABLE I

[Testing place: Cuxhaven, Germany. Experimental period: 150 days]

| Compound used as antifouling agent | Content of active compound in percent, calculated for solid content of the paint[1] | Density of marine growth in percent of the tested surface |
|---|---|---|
| Triphenyl tin chloride | 6 | 0 |
| Do | 9 | 0 |
| Do | 12 | 0 |
| Do | 18 | 0 |
| Triethyl tin chloride | 12 | 20 |
| Do | 12 | 10 |
| Phenyl diethyl tin fluoride | 12 | 20–30 |
| Tri-(p-chloro phenyl) tin chloride | 12 | 60–70 |
| Tri-(m-chloro phenyl) tin chloride | 12 | 50–70 |
| Dibutyl ethyl tin bromide | 12 | 40–50 |
| Dibutyl octyl tin bromide | 12 | 60 |
| Tricyclohexyl tin chloride | 12 | 80 |
| Triethyl tin stearate | 6 | 90 |
| Do | 10 | 90 |
| Do | 12 | 90 |
| Do | 18 | 90 |
| Triethyl lead oleate | 12 | 80–90 |
| Do | 20 | 90 |
| Dichloro diphenyl trichloro methyl methane | 10 | 45 |
| Cuprous oxide and mercuric oxide (3:1) | 44 | 100 |
| Cuprous oxide | 17.4 | 40 |
| Metallic copper powder | 12 | 20 |
| Phenyl mercuric acetate | 12 | 5 |

[1] The paint consisted of: 32% ferric oxide pigment, 26% phenol-formaldehyde-colophony resin as binder, active compound as indicated above, up to 100% toluol as solvent.

TABLE II

[Testing place: Venice, Italy. Experimental period: 11 months]

| Compound used as antifouling agent | Content of active compound in percent, calculated for solid content of the paint[1] | Density of marine growth in percent of the tested surface |
|---|---|---|
| Triphenyl tin chloride | 12 | 10 |
| Do | 18 | 0 |
| Triethyl tin fluoride | 12 | 100 |
| Triphenyl ethyl tin | 12 | 100 |
| Triphenyl tin p-nitro phenolate | 12 | 100 |
| Triphenyl tin hydroxide | 12 | 80 |
| Triphenyl tin thiocyanate | 12 | 80 |
| Diphenyl ethyl tin chloride | 12 | 80 |
| Diphenyl ethyl tin fluoride | 12 | 80 |
| Phenyl diethyl tin thiocyanate | 12 | 100 |
| Triethyl tin p-nitro phenolate | 12 | 100 |
| Triethyl-α-naphthyl tin | 12 | 100 |
| Tri-n-butyl tin fluoride | 12 | 100 |
| Tri-(p-chloro phenyl) tin chloride | 12 | 100 |
| Tri-(m-chloro phenyl) tin chloride | 12 | 100 |
| Triphenyl tin trichloro acetate | 12 | 90 |
| Tricyclohexyl tin chloride | 12 | 100 |
| Triethyl tin stearate | 12 | 90 |
| Triethyl lead oleate | 12 | 90 |

[1] The paint consisted of: 32% ferric oxide pigment, 26% phenol-formaldehyde-colophony resin as binder, active compound as indicated above, up to 100% toluol as solvent.

It is evident from these comparative tests that triphenyl tin chloride is far superior in its antifouling activity to the heretofore known agents. It is especially noteworthy that triphenyl tin chloride is highly effective even under subtropical conditions, as they prevail in the Mediterranean where it is much more difficult to prevent marine growth on ship bottoms and the like surfaces than, for instance, in the North Sea. It is evident that slight changes in the composition of the triphenyl tin chloride molecule considerably decrease or even completely nullify its antifouling activity. For instance, by substituting the phenyl nucleus by a chlorine atom, the antifouling activity is almost completely destroyed.

Triphenyl tin chloride has the further advantage over most organic tin compounds and particularly over the triethyl tin compounds that it has a low toxicity for human beings. Furthermore, it is almost odorless while, for instance, the triethyl tin compounds are characterized by an extremely penetrating odor and severely irritate the mucous membranes of the upper respiratory organs.

The following examples serve to illustrate antifouling compositions containing triphenyl tin chloride as antifouling agent as they have proved of value according to the present invention without, however, limiting the same thereto.

Example 1

| | G. |
|---|---|
| Colophony | 29 |
| Coumarone soft grade | 12 |
| Zinc stearate | 2 |
| Ferric oxide | 16 |
| Magnesium silicate | 20 |
| Zinc oxide | 19 |
| Triphenyl tin chloride | 15 |

The components are intimately mixed with each other and are diluted with mineral spirits to the desired viscosity.

Example 2

| | G. |
|---|---|
| Rosin ester gum | 15 |
| Rum East India gum | 15 |
| Iron oxide | 45 |
| Mineral spirits | 60 |
| Triphenyl tin chloride | 25 |

The components are intimately mixed in known mixing devices.

Example 3

| | G. |
|---|---|
| Antimony oxide | 130 |
| Bone black | 2 |
| Titanium dioxide | 155 |
| Red iron oxide | 2 |
| Alkyd resin | 280 |
| Drier solution | 20 |
| Hydrocarbon solvent | 340 |
| Triphenyl tin chloride | 120 |

The alkyd resin is composed, for instance, of about one part of a 52% linseed oil modified glyceryl phthalate and two parts of glyceryl phthalate modified with a mixture of about 35% linseed oil and 14% China-wood oil. The drier solution is a conventional mixture of metallic soaps, such as cobalt-zinc, calcium-lead, cobalt-calcium or the like soap mixtures, dispersed in the hydrocarbon solvent.

The compositions may be applied to the surfaces to be protected directly or as final layer on an anticorrosive primer coating.

Example 4

| | Percent |
|---|---|
| Phthalic-maleic-propylenglycolester-resin comprising polymerisable monostyrene | 90.5 |
| Benzoyl peroxide | 4 |
| Dimethyl aniline | 0.5 |
| Triphenyl tin chloride | 5 |

The triphenyl tin chloride is added to the resin which is ready for casting and already contains the catalyst and the accelerator by stirring and is homogenized. The antifouling agent is thereby dissolved completely or partially.

The casting mass is then cast into the mould in known manner and hardened cold or warm according to the type of the resin.

In order to increase the mechanical strength these resins can also be modified by incorporating glass fibre fabrics, i.e. glass fibre cloths, glass fibre mats, glass fibre laminates, under the condition that the raw material is alkali-free.

In analogous manner, the triphenyl tin chloride may be incorporated into other known plastic material or other matter, such as concrete, etc. which is used as construction material for watercrafts or other purposes for under-water-use.

Of course, many variations and changes in binding agents, pigments, driers, solvents, and the like may be made by those skilled in the art in accordance with the principles set forth herein and in the claims annexed hereto.

For instance, in place of the resinous binding agents used in the preceding examples there may be employed chlorinated synthetic rubber, butyl rubber, polyvinyl resins, shellac, phenolic-base varnishes, and others.

Triphenyl tin chloride as antifouling agent according to the present invention is incorporated in the antifouling compositions in amounts between about 2% and about 12% calculated for the total paint composition or, respectively, in amounts between about 4% and about 24% calculated for the solid content of the paint.

The most preferred amount to be added to paint compositions is from 6–12%, especially 12% (calculated for the total paint composition).

For use in plastic material, concrete, etc. the concentration of the active compound should be 0.5–5%, especially 2.5% of the material used.

I claim:

1. Antifouling marine paint composition consisting essentially of varnish, pigment and, as antifouling agent, triphenyl tin chloride intimately and uniformly distributed throughout the paint vehicle.

2. Antifouling marine paint composition consisting essentially of, varnish, pigment and, as antifouling agent, triphenyl tin chloride intimately and uniformly distributed throughout the paint vehicle in an amount between about 2% and about 12% calculated for the total amount of such a paint composition and between about 4% and about 24% calculated for the solid content of such a paint composition.

3. Antifouling marine paint composition consisting essentially of a synthetic copal resin, a pigment, a diluent, and, as antifouling agent, triphenyl tin chloride in an amount between about 2% and about 12% calculated for the total amount of such a paint composition and between about 4% and about 24% calculated for the solid content of such a paint composition.

4. In a method of preventing marine growth on underwater surfaces, the step comprising applying to said surfaces a marine paint composition consisting essentially of varnish, pigment and, containing triphenyl tin chloride as antifouling agent in an amount between about 2% and about 12% calculated for the total amount of such paint and between about 4% and about 24% calculated for the solid content of such paint.

References Cited in the file of this patent

UNITED STATES PATENTS

| 2,862,944 | Gloskey | Dec. 2, 1958 |

FOREIGN PATENTS

| 572,944 | Canada | Mar. 24, 1959 |
| 734,119 | Great Britain | July 27, 1955 |